United States Patent [19]
Hirota

[11] Patent Number: 5,269,730
[45] Date of Patent: * Dec. 14, 1993

[54] DIFFERENTIAL GEAR DEVICE FOR VEHICLE

[75] Inventor: Isao Hirota, Tochigi, Japan

[73] Assignee: Tochigifujisangyo Kabushiki Kaisha, Tochigi, Japan

[*] Notice: The portion of the term of this patent subsequent to Oct. 20, 2009 has been disclaimed.

[21] Appl. No.: 921,561

[22] Filed: Jul. 29, 1992

Related U.S. Application Data

[63] Continuation-in-part of Ser. No. 710,545, Jun. 5, 1991, Pat. No. 5,156,578.

Foreign Application Priority Data

Jun. 5, 1990 [JP] Japan .................... 2-58764[U]

[51] Int. Cl.⁵ .............................. F16H 33/04
[52] U.S. Cl. ................... 475/150; 475/149; 475/249; 192/84 B
[58] Field of Search ............ 475/149, 150, 248, 249, 475/250, 221; 192/84 B, 84 C

[56] References Cited

U.S. PATENT DOCUMENTS

| | | | |
|---|---|---|---|
| Re. 33,742 | 11/1991 | Blessing | 475/150 OR |
| 3,224,540 | 12/1965 | Straub | 192/84.15 X |
| 4,733,577 | 3/1988 | Griesser et al. | 475/150 OR |
| 4,781,078 | 11/1988 | Blessing et al. | 475/150 OR |
| 4,860,612 | 8/1989 | Dick et al. | 475/221 X |
| 4,989,686 | 2/1991 | Miller et al. | 475/150 X |
| 5,024,634 | 6/1991 | Blessing | 475/249 X |

Primary Examiner—Leslie A. Braun
Assistant Examiner—Daniel Wittels
Attorney, Agent, or Firm—Graham & James

[57] ABSTRACT

A differential gear device for a vehicle is disclosed. The differential gear device is provided with a planetary gearing for producing differential motion having a ring gear with a toothed portion, and an electro-magnetic multiple clutch for limiting the differential motion. The electro-magnetic clutch is provided with a plurality of outer friction plates and a plurality of inner friction plates alternately positioned with the outer friction plates. An outer rotary member made of a nonmagnetic substance and integrally joined to the ring gear is provided for the electro-magnetic multiple clutch. A support member is made of a magnetic substance and conducts a magnetic force from the electro-magnet to the armature through the outer and inner friction plates to attract the armature to engage the outer and inner friction plates in cooperation with the armature. The support member is connected with the outer rotary member.

4 Claims, 3 Drawing Sheets

DIFFERENTIAL GEAR DEVICE FOR VEHICLE

RELATED APPLICATIONS

The present application is a continuation-in-part of the patent application Ser. No. 07/710,545, filed Jun. 5, 1991, which matured into U.S. Pat. No. 5,156,578.

BACKGROUND OF THE INVENTION

1. Field of the Invention

This invention relates to a differential gear device for a vehicle and more particularly to a differential gear device with a limited slip differential device.

2. Description of the Prior Art

Conventionally, in the differential gear device used for vehicles such as automobiles, it has been well known that many kind of limited slip differential devices (LSD) have been used in order to limit the differential movement in differential gearing.

These differential gear device include a device shown in U.S. Pat. No. 4,781,078. This differential gear device uses an electromagnet as an actuator in order to control the limiting force to limit the differential movement in the differential gearing by an operation at an outside. This differential gear device includes an electromagnet secured to an outer housing in an axial and a rotational directions, and an armature secured to a differential casing in a rotational direction and supported by the differential casing in a manner allowing movement only in the axial direction. A gap is provided between the electromagnet and the armature. The armature is connected to a clutch cage arranged in the differential case. A plurality of friction plates are provided between the clutch cage and a sun gear. The friction plates are alternately connected to the clutch cage and the sun gear. The armature is always pressed by a spring so as to be away from the clutch cage to engage the friction plates one another. When the electromagnet is energized, the armature is attracted to the electromagnet to increase the engaging force between the friction plates, so that a large differential limiting force is produced.

However, in this configuration, when the friction plates are worn away by the differential limiting operation, the gap is changed which is produced between the armature and the electromagnet. A magnetic force is changed in proportion to the square of the gap. Therefore, the change of the gap greatly affects the differential limiting force and there is a fear that a desired differential limiting force is not produced. When the friction plate are further worn away, the gap run out so that the limited slip differential device does not work. The similar device is shown in U.S. Pat. No. 4,860,612.

Another device is shown in U.S. Pat. No. 4,989,686. In this device, a magnetic force from an electromagnet attracts a plurality of friction disc through a rotator to engage the rotator and the friction disc. Consequently, the rotator rotates relatively to a sleeve to move the rotator and the friction disc by a ball cam to engage the clutch plates. However, in this device, the gap between the rotator and the friction disc also changes to greatly affect the differential limiting force, and there is a fear that the clutch plates fall away because of the change of the gap between the friction disc and the clutch plate.

SUMMARY OF THE INVENTION

An object of the present invention is to provide a differential gear device for a vehicle in which a differential limiting force does not change and clutch plates do not fall away because of a change of a gap.

This and other objects can be achieved according to this invention by providing a differential gear device for a vehicle, comprising: a planetary gearing for producing a differential motion, including a ring gear with a tooth portion; and a electro-magnetic multiple clutch for limiting the differential motion, including a plurality of outer friction plates, a plurality of inner friction plates alternately positioned with said outer friction plates, an outer rotary member made of a nonmagnetic substance, integrally joined to said ring gear and provided with a tooth portion for engaging said outer friction plates, an inner rotary member with a tooth portion for engaging said inner friction plates, an electromagnet for engaging said outer and inner friction plates, an armature attracted by said electromagnet to engaging said outer and inner friction plates; and a support member made of a magnetic substance, conducting a magnetic force from said electromagnet to said armature through said outer and said inner friction plates to attract said armature, engaging said outer and inner friction plates in cooperation with said armature, said support member connected with said outer rotary member.

DETAILED DESCRIPTION OF THE PREFERRED EMBODIMENTS

Figure 1:
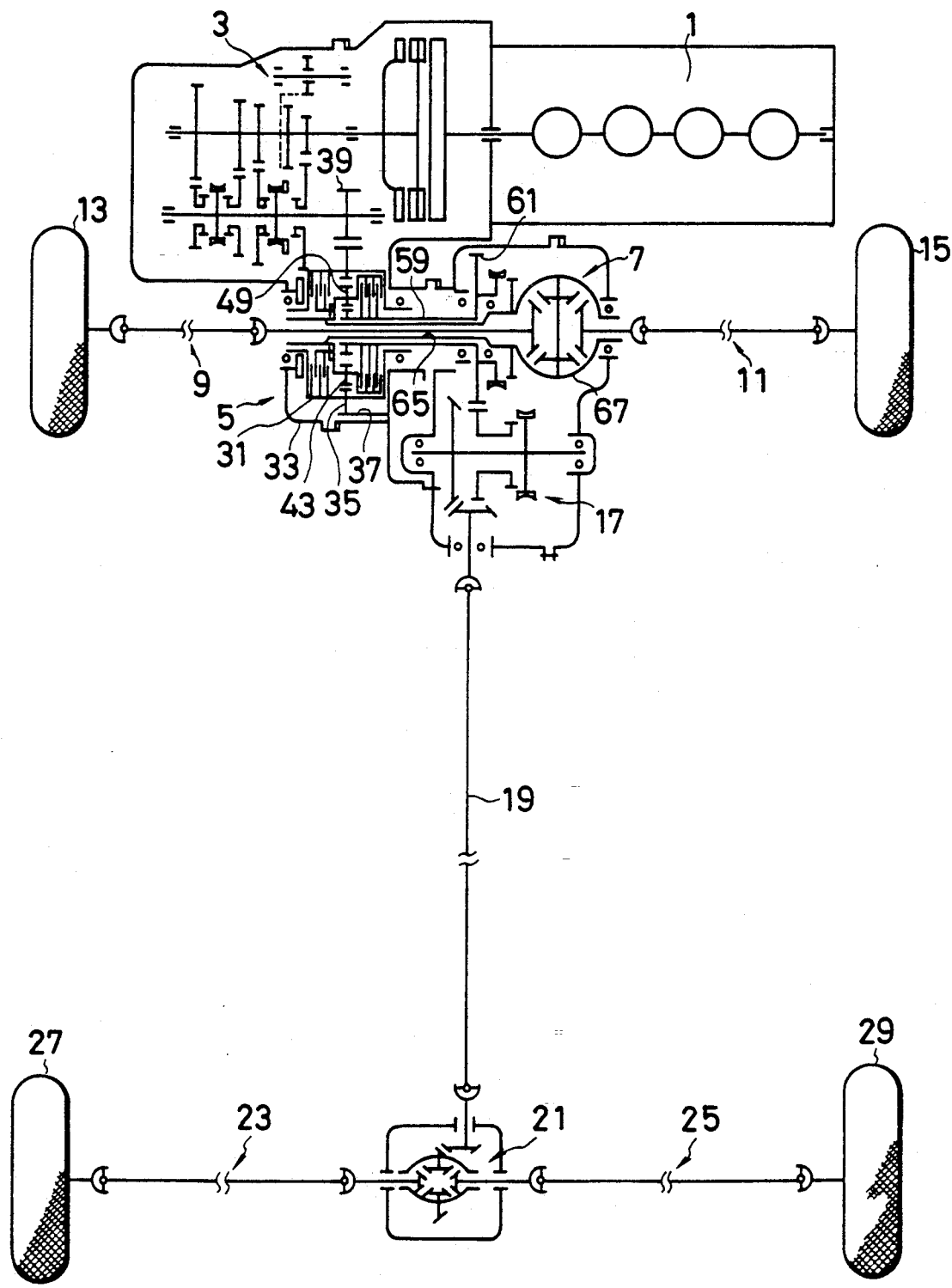
FIG. 1 shows a schematic view of a power system of a vehicle with an embodiment of a differential gear device according to the present invention.

Referring FIG. 1, a power system of a vehicle comprises an engine 1, a transmission 3, a center differential gear device (a differential gear device between the front and rear axles) 5, a front differential gear device (a differential gear device on the front axle side) 7, a plurality of front axles 9, 11, a right and a left front wheels 13, 15, a gear device for changing direction 17, a propeller shaft 19, a rear differential gear device (a differential gear device on the rear axle side) 21, a plurality of rear axles 23, 25, and a right and a left rear wheel 27, 29, or the like.

Figure 2:
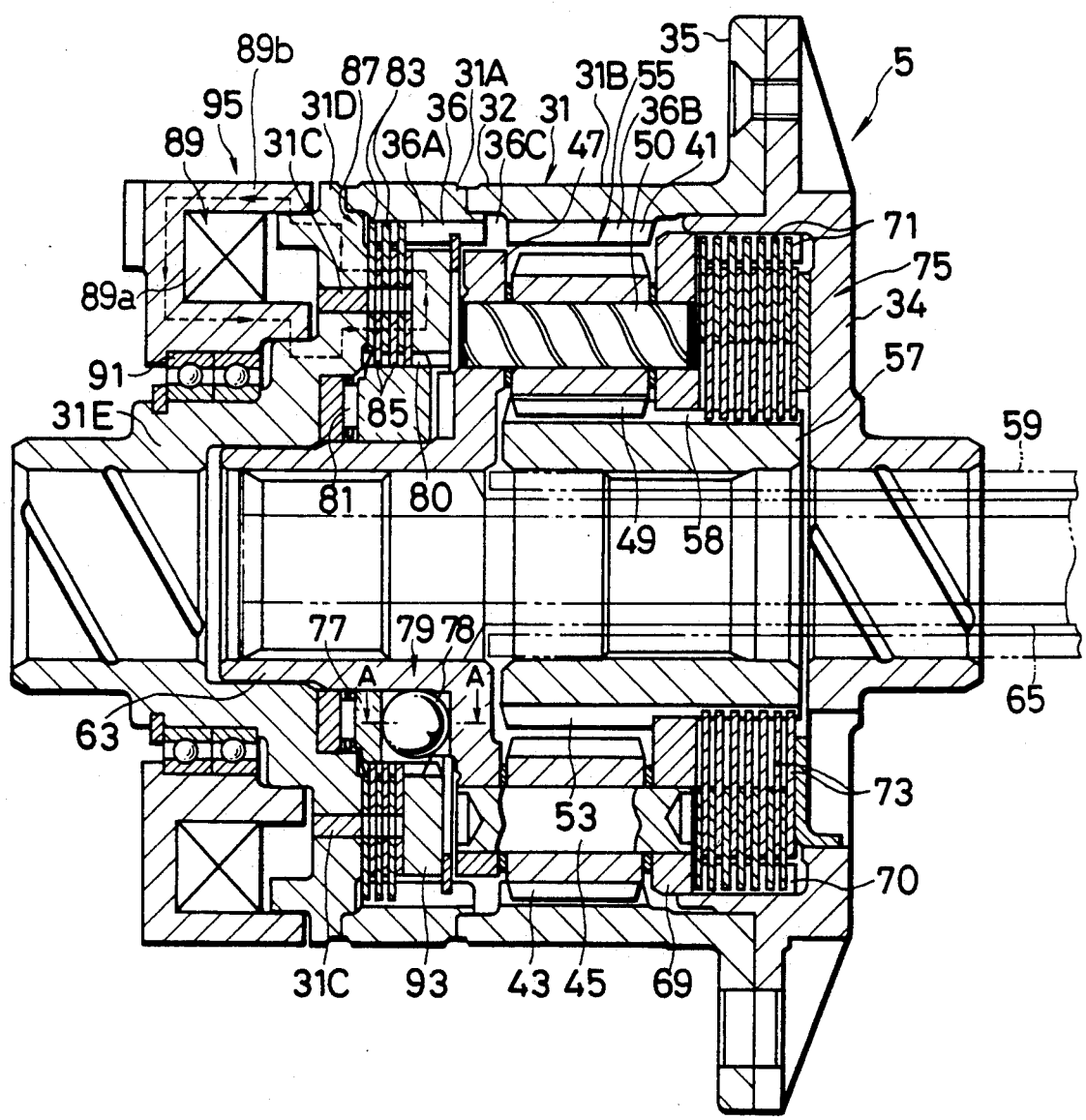
FIG. 2 is a sectional view of the differential gear device of the above embodiment.
Figure 3:
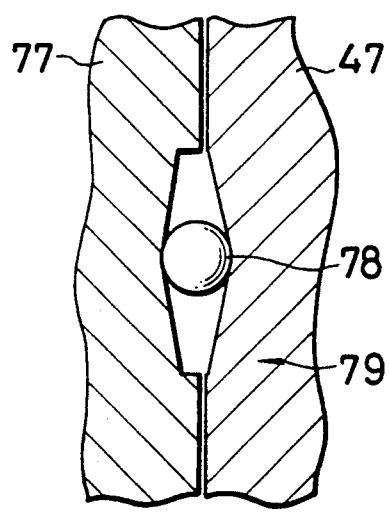
FIG. 3 is a partial sectional view taken along line A—A of FIG. 2.

FIG. 2 shows an differential gear device with a limited slip differential device (LSD) which can provide a large differential limiting force with a small force. A differential casing 31 of the center differential gear device 5 is positioned in a transmission casing 33 in a freely rotatable manner. A flange portion 35 of the differential casing 31 is connected with a ring gear 37 by means of bolts. The ring gear 37 engages a drive gear 39 of the transmission 3.

The differential casing 31 comprises a cylindrical portion 32, and a cover 34 for closing an opening on the right side in the figure of the cylindrical portion 32. The differential casing 31 is provided with a internal gear (ring gear) 41 on the inner side thereof, which engages an outer planet gear 43. The outer planet gear 43 is supported by a pivot shaft 45 in a freely rotatable manner, which is supported by a planet carrier 47. The outer planet gear 43 engages an inner planet gear 49 which is supported by a pivot shaft 50 in a freely rotatable manner and engages a sun gear 53. The pivot shaft 50 is supported by the planet carrier 47. The internal gear 43, planet gears 43, 49, planet carrier 47 and sun gear 53 constitute a planetary gearing 55.

The planet carrier 47 has a boss portion 63 engaging an end of an inner hollow shaft (with an axle on one side) 65 inside thereof by means of splines. The sun gear 53 has a boss portion 57 engaging an end of an outer hollow shaft (with another axle on the other side) 59 thereof by means of splines. The outer hollow shaft 59, as shown in FIG. 1, is connected with the gear device for changing direction 17 through a gear 61 at the other end thereof. The inner hollow shaft 65 is inserted into the outer hollow shaft 59 in a freely rotatable manner and is connected with a differential casing 67 of the front differential gear device 7.

As shown in FIG. 2, on the right side in figure of the planetary gearing 55, a clutch drum 69 is positioned in a manner allowing rotation relative to the differential casing 31. The clutch drum 69 is secured to the right side of the pivot shafts 45, 50 secured to the planet carrier 47. The clutch drum 69 is provided with a tooth portion 70 and a plurality of outer friction plates 71 engage the tooth portion 70 in a manner allowing movement only in the axial direction. A boss portion 57 of the sun gear 53 is provided with a tooth portion 58 and a plurality of inner friction plates 73 engage the tooth portion 58 in a manner allowing movement only in the axial direction. The friction plates 73 are alternately positioned with the friction plates 71 in the axial direction. The clutch drum 69, friction plates 73, 71 and tooth portion 58 of the boss portion 57 constitute a multiple disc clutch 75 for limiting differential motion between the sun gear 53 and the planet carrier 47. When the multiple disc clutch 75 is engaged. The relative rotation between the sun gear 53 and the planet gear 47 is limited to limit the differential motion between the front and rear axles 9, 11, 23, 25.

A cam ring 77 is positioned on the outer peripheral side of the boss portion 63 of the planet carrier 47. A ball 78 is positioned between the cam ring 77 and the planet carrier 47. The cam ring 77, ball 78 and a part of the planet carrier 47 constitute a cam structure 79. A thrust bearing 81 for receiving a thrust reaction force is positioned between the cam ring 77 and the differential casing 31.

A plurality of outer friction plates 83 and a plurality of inner friction plates 85 are alternately positioned in the axial direction between the planet carrier 47 and the differential casing 31. The outer friction plates 83 engage a tooth portion 36A with splines in the inner peripheral portion of the differential casing 31 in a manner allowing movement only in the axial direction. The inner friction plates 85 engage a tooth portion 80 with splines in the outer peripheral portion of the cam ring 77 in a manner allowing movement in the axial direction. The inner and outer friction plates 83, 85, tooth portion 36A of the differential casing 31 and tooth portion of the cam ring 77 constitute a multiple disc clutch 87. An electromagnet 89 is positioned on the outer peripheral side of the differential casing 31 through a bearing 91. The electromagnet 89 is composed of a coil 89a and a magnetic pole 89b. A pressure ring (armature) 93 for engaging the multiple disc clutch 87 by the magnetic force of the electromagnet 89 is positioned between the multiple disc clutch 87 and the planet carrier 47. The multiple disc clutch 87, electromagnet 89 and pressure ring 93 constitute an electro-magnetic multiple clutch 95.

The differential casing 31 comprises a nonmagnetic substance part 31A for engaging the friction plates 83, 85, a magnetic substance part 31B connected to the right side in the figure of the nonmagnetic substance part 31A, a magnetic substance part 31D connected to the left side in the figure of the nonmagnetic substance part 31A, a ringed nonmagnetic substance part 31C connected to the inner peripheral surface of the magnetic substance part 31D, and a magnetic substance part 31E connected to the inner peripheral surface of the nonmagnetic substance part 31C. The nonmagnetic substance part 31A, 31C and magnetic substance part 31B, 31D, 31E are respectively interconnected preferably by welding. The nonmagnetic substance parts 31A, 31C are preferably made of stainless steel and the magnetic substance parts 31B, 31D, 31E are preferably made of chromium molybdenum steel (for example, 34CrMo4, 42CrMo4).

By these nonmagnetic substance part 31A, 31C, most of the line of magnetic force is guided to the friction plates 83, 85 through the magnetic substance parts 31D, 31E and forms a closed loop (as designated by the broken line in FIG. 2) through the pressure ring 93 without passing the magnetic substance part 31B of the differential casing 31 and short-circuiting. As a result, the friction plates 83, 85 and the pressure ring 93 are efficiently attracted by the electromagnet 89 to produce a large connecting force.

The magnetic substance parts 31D, 31E serve as support members conducting the magnetic force from the electromagnet 89 to the pressure ring (armature) 93 through the outer and inner friction plates 83, 85 to attract the pressure ring 93. The magnetic substance parts 31D, 31E engage the outer and inner friction plates 83, 85 in cooperation with the pressure ring 93. In addition, slight gaps are provided between the magnetic substance parts 31D, 31E and the magnetic pole 89b, and the magnetic substance parts 31D, 31E can rotate relatively to the magnetic pole 89b. Moreover, the differential casing 31 including the magnetic substance parts 31D, 31E is supported by bearings (not shown in Figs).

To efficiently attract the friction plates 83, 85, the line of magnetic force must be efficiently guided to the friction plates 83, 85 constituting the multiple disc clutch 87. Therefore, the nonmagnetic substance part 31A is preferably made of stainless steel. However, when the nonmagnetic substance part 31A is connected with the magnetic substance part 31B by welding, if the tooth portion 36A is not properly continuous with the tooth portion 36B at the connecting part, the friction plates 83 cannot be inserted into and engage the tooth portion 36A on assembling. Namely, in a configuration in which the friction plates 83 are inserted from the side of the magnetic substance part 31B, if the tooth portion 36A deviates even a little from the tooth portion 36B in the peripheral direction, the friction plates 83 are caught between the tooth portion 31B and the tooth portion 31A and cannot be inserted into the tooth portion 31A.

Therefore, the tooth portion 36 with splines is provided with an aperture 36C at the connecting part between the nonmagnetic substance part 31A and the magnetic substance part 31B. The dimension of the aperture 36C in the axial direction is at least larger than the thickness of one friction plate 83 to make it possible to insert the friction plate 83 through the aperture 36C from lateral side. As a result, even if the tooth portion 36A of the nonmagnetic substance part 31A deviates from the tooth portion 36B of the magnetic substance part 31B in the peripheral direction, the friction plates 83, 85 can be easily inserted into the tooth portion 36A.

Next, the action of this embodiment will be described.

The rotation of the differential casing 31 by the driving force from the engine 1 is transmitted by the engagement of the planetary gearing 55 from the planet carrier 47 to the front axle 13, 15 and from sun gear 53 to the rear axle 27, 29. In this case, when there is a difference of driving resistance between the front and rear axles 9, 11, 23, 25, the driving force from the engine 1 is differentially distributed to the front axles 9, 11 and the rear axles 23, 25 according to the difference of driving resistance by the relative rotation between the sun gear 53 and the planet carrier 47 by the rotation and the revolution of the planet gear 43, 49.

When the electro-magnetic multiple clutch 95 is engaged, a large differential limitation is provided by the small engaging force of the multiple disc clutch 87 because the cam ring 77 is connected with the planet carrier 47 through the cam structure 79. Namely, when between the front and rear axles, in short between the differential casing 31 and the planet carrier 47, a differential rotational force occurs, the differential rotational force acts on the cam structure 79 to produce a thrust force. The thrust force acts on the multiple disc clutch 75 through the planet carrier 47 and the clutch drum 69 to press the multiple disc clutch 75 to engage the multiple disc clutch 75 and to produce an even larger differential limiting force.

When the electro-magnetic multiple crutch 95 is disengaged the cam structure 79 does not produce the thrust force because the cam ring 77 rotates together with the planet carrier 47. As a result, the multiple clutch 75 is disengaged to release the differential rotation. The electro-magnetic multiple disc clutch 95 is constructed to be manually operated from the driver's seat as in the above operation or to be automatically operated according to the steering conditions and the condition of the surface of the road.

The function of this center differential device 5 will now be described with reference to the vehicle in FIG. 1.

When the electro-magnetic multiple disc clutch 95 is disconnected, the center differential device 5 allows free differential motion between the front and rear axles to make the vehicle turn smoothly to prevent the tight corner braking phenomenon. When the electro-magnetic multiple disc clutch 95 is engaged, the center differential device 5 limits the differential motion between the front and rear axles according to the engaging force. Therefore, even if one side of the front wheel 13, 15 or the rear wheel 27, 29 slip because of a bad road conditions or the like, because the driving force is transmitted to the other wheel by the torque transmission by the differential limitation, the vehicle can avoid being mired because of bad road conditions.

In this differential device, even if the outer friction plates 83 and the inner friction plates 85 are worn away, the gaps between the magnetic substance parts 31D, 31E and the magnetic pole 89b do not change. Therefore, the magnetic force conducted from the electromagnet to the pressure ring 93 does not change and the outer and inner friction plates 83, 85 are prevented from falling away.

In addition, in the above embodiment the present invention is applied to the center differential device for the vehicle with four-wheel drive, but this invention may be applied to the front differential device and/or the rear differential device.

What is claimed is:

1. A differential gear device for a vehicle, comprising:
   (a) a planetary gearing for producing a differential motion, including a ring gear with a toothed portion; and
   (b) an electro-magnetic multiple disc clutch for limiting the differential motion, including
      (1) a plurality of outer friction plates,
      (2) a plurality of inner friction plates alternately positioned with said outer friction plates,
      (3) an outer rotary member made of a nonmagnetic substance, integrally joined to said ring gear and provided with a toothed portion for engaging said outer friction plates,
      (4) an inner rotary member with a toothed portion for engaging said inner friction plates; and
      (5) an electromagnet for engaging said outer and inner friction plates,
      (6) an armature attracted by said electromagnet to engaging said outer and inner friction plates; and
      (7) a support member made of a magnetic substance, conducting a magnetic force from said electromagnet to said armature through said outer and inner friction plates to attract said armature, engaging said outer and inner friction plates in cooperation with said armature, said support member connected with said outer rotary member.

2. The differential gear device for a vehicle of claim 1, wherein said planetary gearing comprises a sun gear, planet gears and planet carrier; said differential gear device further comprises a multiple disc clutch for limiting a differential motion between said sun gear and said carrier, a cam structure for producing a thrust force to engage said multiple disc clutch by a differential motion between said outer rotary member and said inner rotary member when said electro-magnetic multiple clutch is engaged, said cam structure including a cam ring as said inner rotary member.

3. The differential gear device for a vehicle of claim 2, wherein said sun gear is connected to rear axles to drive rear wheels, and said planet carrier is connected to front axles to drive front wheels.

4. The differential gear device for a vehicle of claim 1, wherein said outer rotary member and said support member being supported through bearings.

* * * * *